Jan. 19, 1932.   R. J. SCHMIDT   1,842,124

TIRE REPAIR VULCANIZER

Filed March 19, 1930

INVENTOR
RICHARD J. SCHMIDT

BY  Ely & Barrow

ATTORNEYS

Patented Jan. 19, 1932

1,842,124

UNITED STATES PATENT OFFICE

RICHARD J. SCHMIDT, OF AKRON, OHIO, ASSIGNOR TO THE AKRON EQUIPMENT COMPANY, OF AKRON, OHIO, A CORPORATION OF OHIO

TIRE REPAIR VULCANIZER

Application filed March 19, 1930. Serial No. 436,990.

This invention relates to tire repair vulcanizers.

The general purpose of the invention is to improve upon vulcanizers of the type shown in Wheelock United States Patent No. 1,630,815, which comprises an arcuate heated arm or core on which the tire is mounted and on which a repair in the tire is cured by pressing the tire section on said core with pressure plates and heating the core to a vulcanizing temperature.

Particularly the invention has for its object the provision in place of the core as shown in the above patent of an arcuate heated arm, which may be hollow and may have piping connections thereto for circulating a heated fluid therein, and a removable core element adapted to be quickly mounted on or demounted from said arm whereby the apparatus is effectively adapted for vulcanizing various sizes of tires.

The foregoing and other objects of the invention are attained in the tire repair vulcanizer shown in the accompanying drawings and described below. It is to be understood that the invention is not limited to the specific form thereof shown and described.

Of the accompanying drawings.

Figure 2:
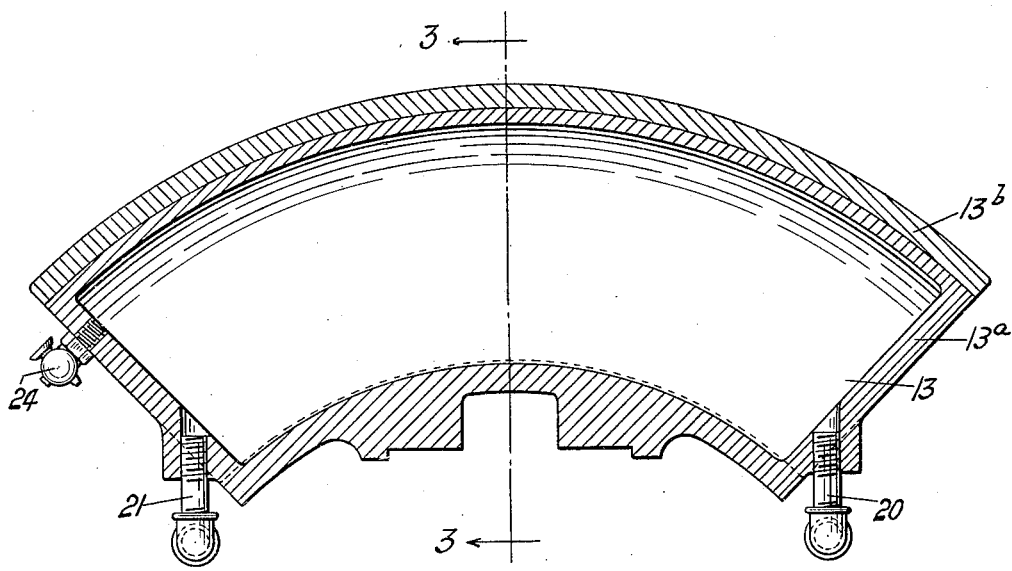
Figure 2 is an enlarged longitudinal section through the core structure.
Figures 1, 3:
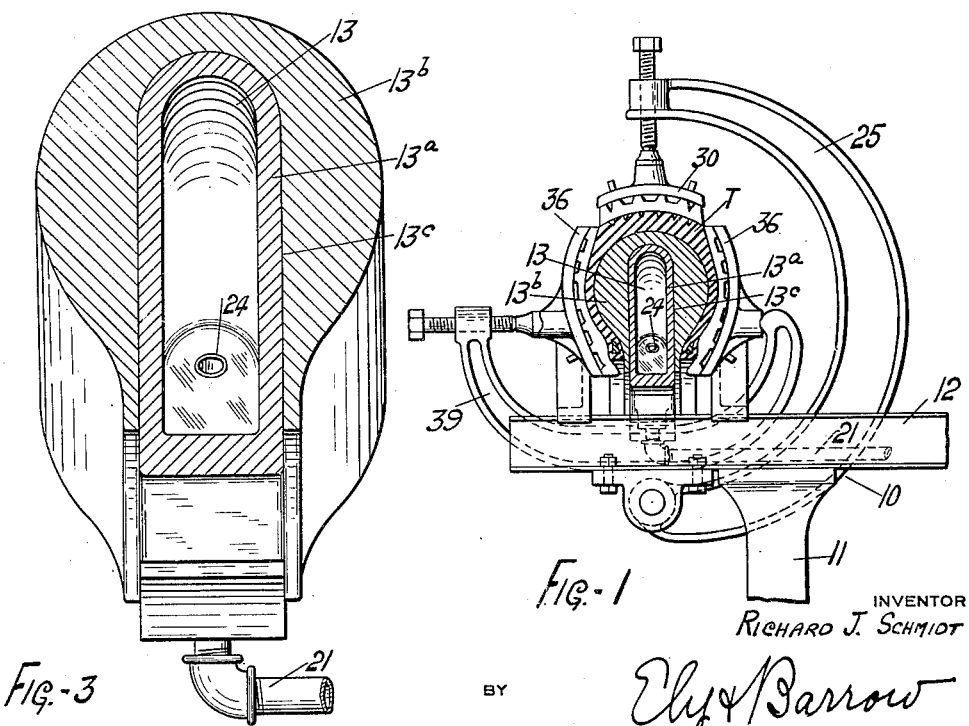
Figure 1 is an end view, partly in section, of a tire repair vulcanizer embodying the invention.
Figure 3 is an enlarged section on line 3—3 of Figure 2.

Referring to the drawings, the numeral 10 represents the supporting frame, 11 the legs, 12 the channel beams or rails, 13 the hollow core structure all arranged substantially as in the above-mentioned patent with side pressure plates 36 operable against the sides of the tire by the clamping device 39 and with a tread pressure plate 30 operable against the tread of the tire by clamping device 25.

Steam or other heating fluid may be supplied the core 13 by a supply pipe 20 connected to one end of the core 13 and a drain connection 21 may be made at the other end of the core. The permit periodic blowing-off of the core, a cock may be provided at 24.

In accordance with the present invention, the core is constructed with an internal hollow member $13^a$ which may be an iron casting cored to form the internal steam space and suitably shaped to receive a removable core body $13^b$, preferably having its sides flat and parallel as shown. The core body $13^b$ is formed with an internal groove $13^c$ for fitting over the member $13^a$ and with an outer contour corresponding to the interior of a tire casing T. The core body $13^b$ is preferably made of aluminum which is light and yet is a good conductor of heat.

The inner hollow member of the core is permanently mounted and connected up with the piping, etc., as described, and no securing devices or piping connections need be disturbed to effect a core change when various sizes of cores are required, the core body $13^b$ being removed and replaced by a core body of the proper size. It will be apparent that the central member of the core forms no part of the outer contour of the core which is provided by the core body only and which may be formed accurately to fit in the tire for which it is designed. By providing an inner heated member $13^a$ to receive all types or sizes of core bodies $13^b$, the provision of a large number of expensive cored-out castings is also avoided.

It will be apparent from the foregoing that a greatly improved tire repair vulcanizer has been provided by the invention. Obviously modifications thereof may be resorted to without departing from the spirit thereof or the scope of the appended claims.

What is claimed is:—

1. A tire repair vulcanizer including a core comprising an inner hollow member of longitudinally arcuate form and having flat sides, and an outer arcuate member formed with a groove on its inner periphery for removably fitting over said inner hollow member, the outer contour of said outer member being shaped to fit the inside of a tire casing, means for mounting the inner member of the core, connections to said inner member for supplying heated fluid thereto, said outer core member being removable without disturbing said mounting and said connections, and pressure plates operable against the core to hold a tire under pressure against the core during a vulcanizing operation.

2. A tire repair vulcanizer including a core comprising an inner hollow member of longitudinally arcuate form and having parallel lateral faces, and an outer arcuate member formed with a groove on its inner periphery for removably fitting over said inner hollow member, the outer contour of said outer member being shaped to fit the inside of a tire casing, means for mounting the inner member of the core, connections to said inner member for supplying heated fluid thereto, said outer core member being removable without disturbing said mounting and said connections, and means to hold a tire under pressure against the core during a vulcanizing operation.

3. A tire repair vulcanizer including a core comprising an inner hollow member of longitudinally arcuate form and having parallel lateral faces and an outer arcuate member formed with a groove on its inner periphery for removably fitting over said inner hollow member, the outer contour of said outer member being shaped to fit the inside of a tire casing, and means for mounting the inner member of the core, connections to said inner member for supplying heated fluid thereto, said outer core member being removable without disturbing said mounting and said connections.

4. A tire repair vulcanizer including a core comprising an inner hollow member of longitudinally arcuate form having flat parallel sides, and an outer arcuate member formed with a groove on its inner periphery for removably fitting over said inner hollow member, the outer contour of said outer member being shaped to fit the inside of a tire casing, and means for mounting the inner member of the core, connections to said inner member for supplying heated fluid thereto, said outer core member being removable without disturbing said mounting and said connections, said inner core member being of cast iron and said outer core member being of aluminum.

5. A repair vulcanizer of the internal arm type comprising a core arm including an inner heated member adapted to be permanently mounted and formed with flat parallel lateral faces, and an outer core member shaped to the contour of a tire and adapted removably to fit over said inner core member whereby the outer core member is replaceable by other outer core members of various sizes.

RICHARD J. SCHMIDT.